US007482723B2

(12) United States Patent
Azcona Pastor et al.

(10) Patent No.: US 7,482,723 B2
(45) Date of Patent: Jan. 27, 2009

(54) MOUNTING A MOTOR ON A CARRIER

(75) Inventors: Vicente Azcona Pastor, Falces (ES);
Christoph Becke, Grosskarolinenfeld
(DE); Hans-Reinhart Janssen, Giengen
(DE); Alfred Raab, Huettlingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 505 days.

(21) Appl. No.: 10/548,141

(22) PCT Filed: Mar. 17, 2004

(86) PCT No.: PCT/EP2004/002776

§ 371 (c)(1),
(2), (4) Date: Sep. 6, 2005

(87) PCT Pub. No.: WO2004/084380

PCT Pub. Date: Sep. 30, 2004

(65) Prior Publication Data
US 2008/0169716 A1 Jul. 17, 2008

(30) Foreign Application Priority Data
Mar. 21, 2003 (DE) .............................. 203 04 565 U

(51) Int. Cl.
H02K 5/00 (2006.01)
(52) U.S. Cl. ........................................ 310/91; 248/581
(58) Field of Classification Search .................. 310/51, 310/89, 91; 248/636, 638, 674, 676, 581
See application file for complete search history.

(56) References Cited

U.S. PATENT DOCUMENTS

| 2,662,988 | A | * | 12/1953 | McKim | ........................ 310/91 |
| 3,983,429 | A |   | 9/1976  | Allardice, Jr. | |
| 4,076,196 | A | * | 2/1978  | Levine | ........................ 248/675 |
| 4,602,176 | A | * | 7/1986  | Baker | ............................ 310/51 |
| 4,726,112 | A | * | 2/1988  | King et al. | ..................... 29/596 |
| 4,739,206 | A | * | 4/1988  | Sieber | ........................... 310/91 |
| 5,488,259 | A |   | 1/1996  | Cho | |
| 6,528,919 | B2 | * | 3/2003 | Fujii et al. | ..................... 310/88 |

FOREIGN PATENT DOCUMENTS

| EP | 1 197 713 | 4/2002 |
| JP | 8-47195 | 2/1996 |
| JP | 10-322967 | 12/1998 |

OTHER PUBLICATIONS

International Search Report PCT/EP2004/002776 Jul. 28, 2004.

* cited by examiner

Primary Examiner—Dang D Le
(74) Attorney, Agent, or Firm—Russell W. Warnock; James E. Howard

(57) ABSTRACT

A motor arrangement is provided and includes a mounting clamp having flanks that support the shaft lugs of a motor. The mounting clamps includes arms that are in rotation-blocking contact with a motor housing of a motor and these arms are elastically configured so that deviations in housing dimensions from one make of motor to the other can be adapted.

18 Claims, 5 Drawing Sheets

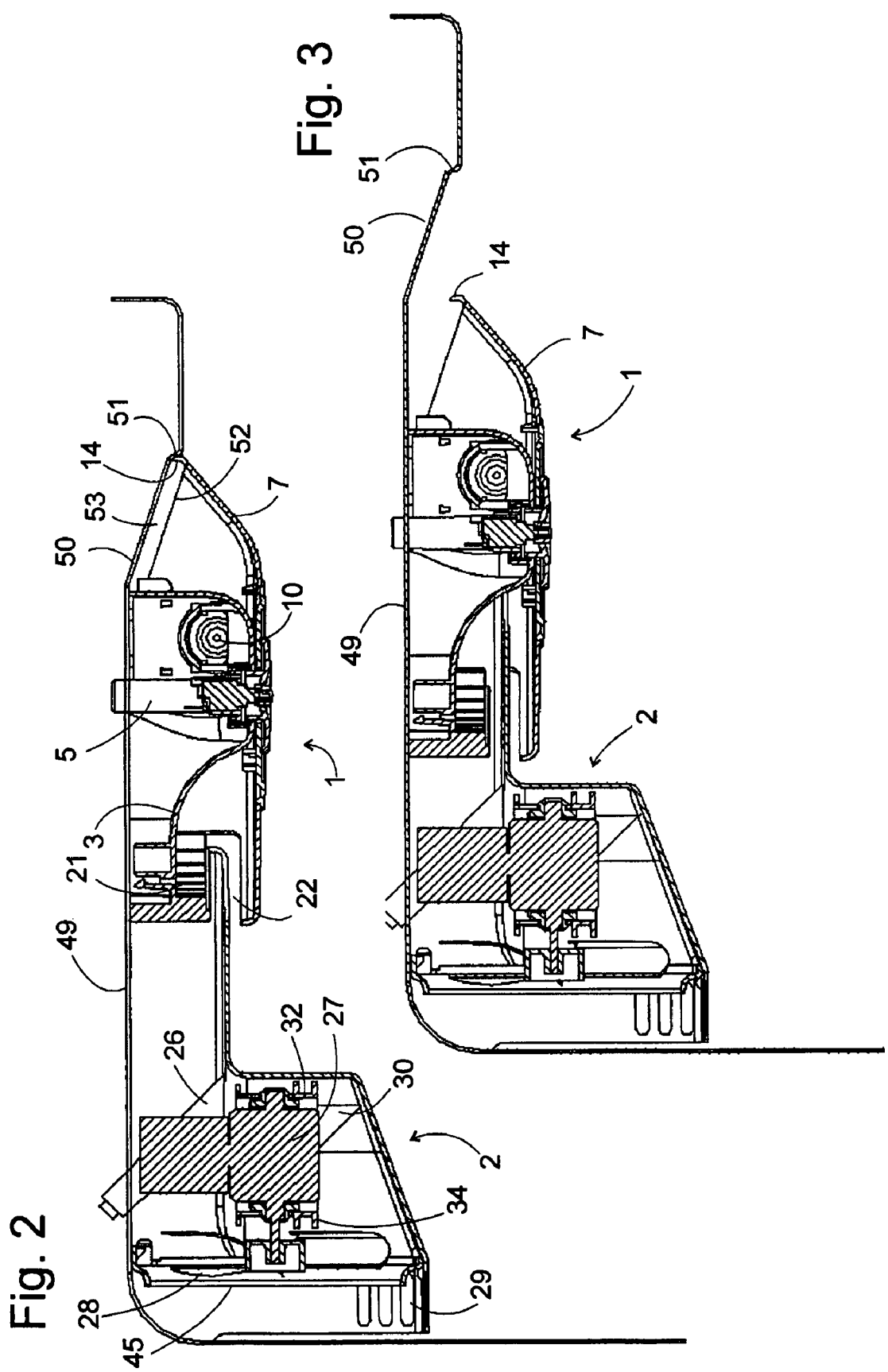

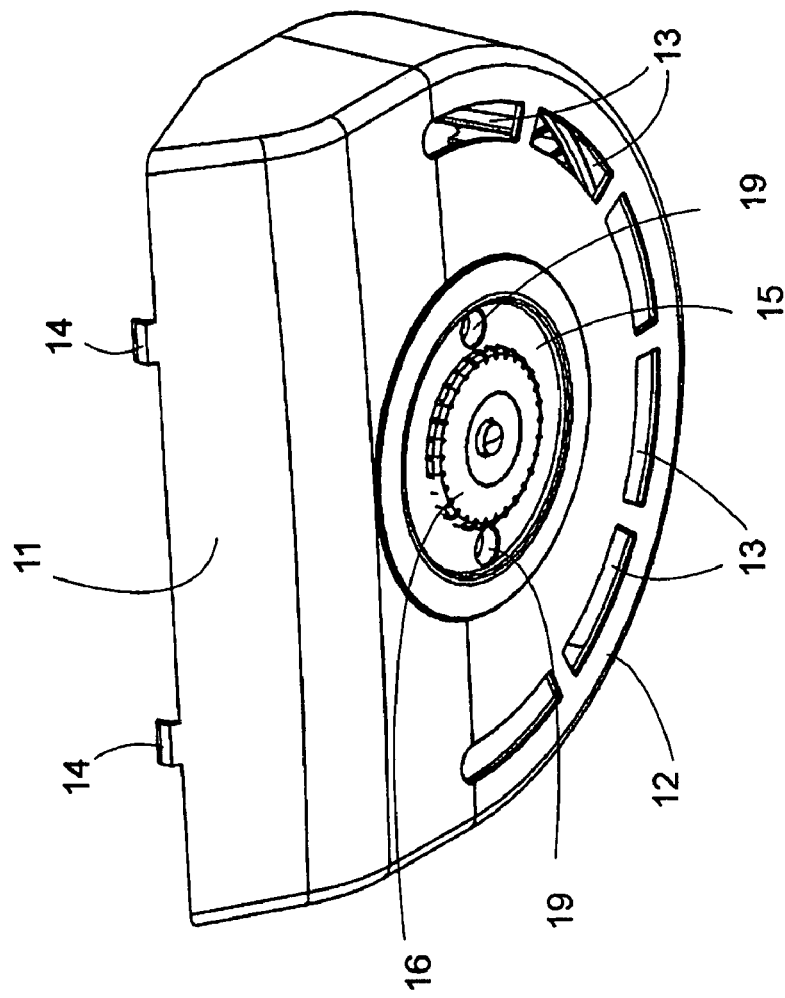
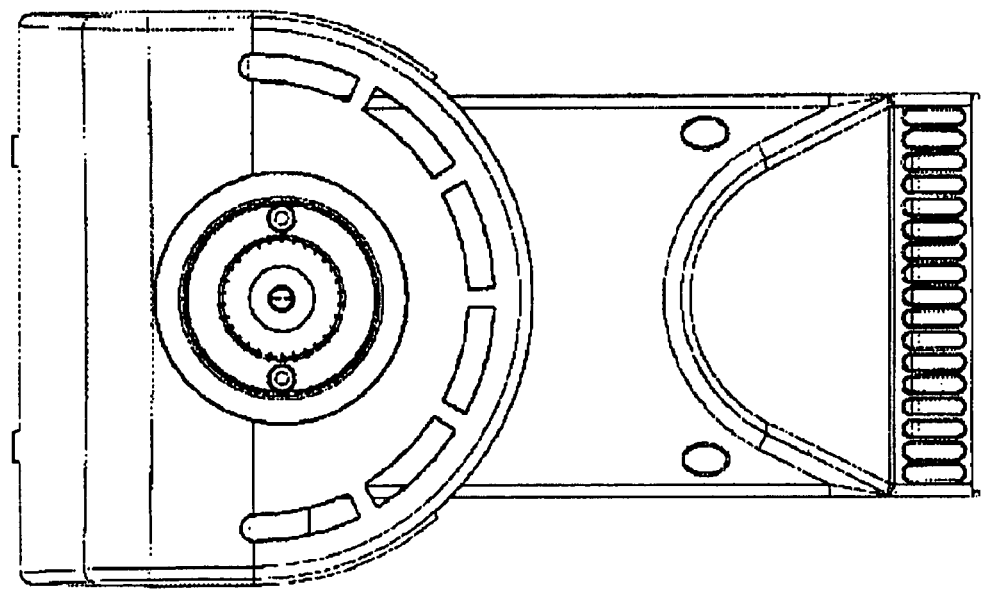

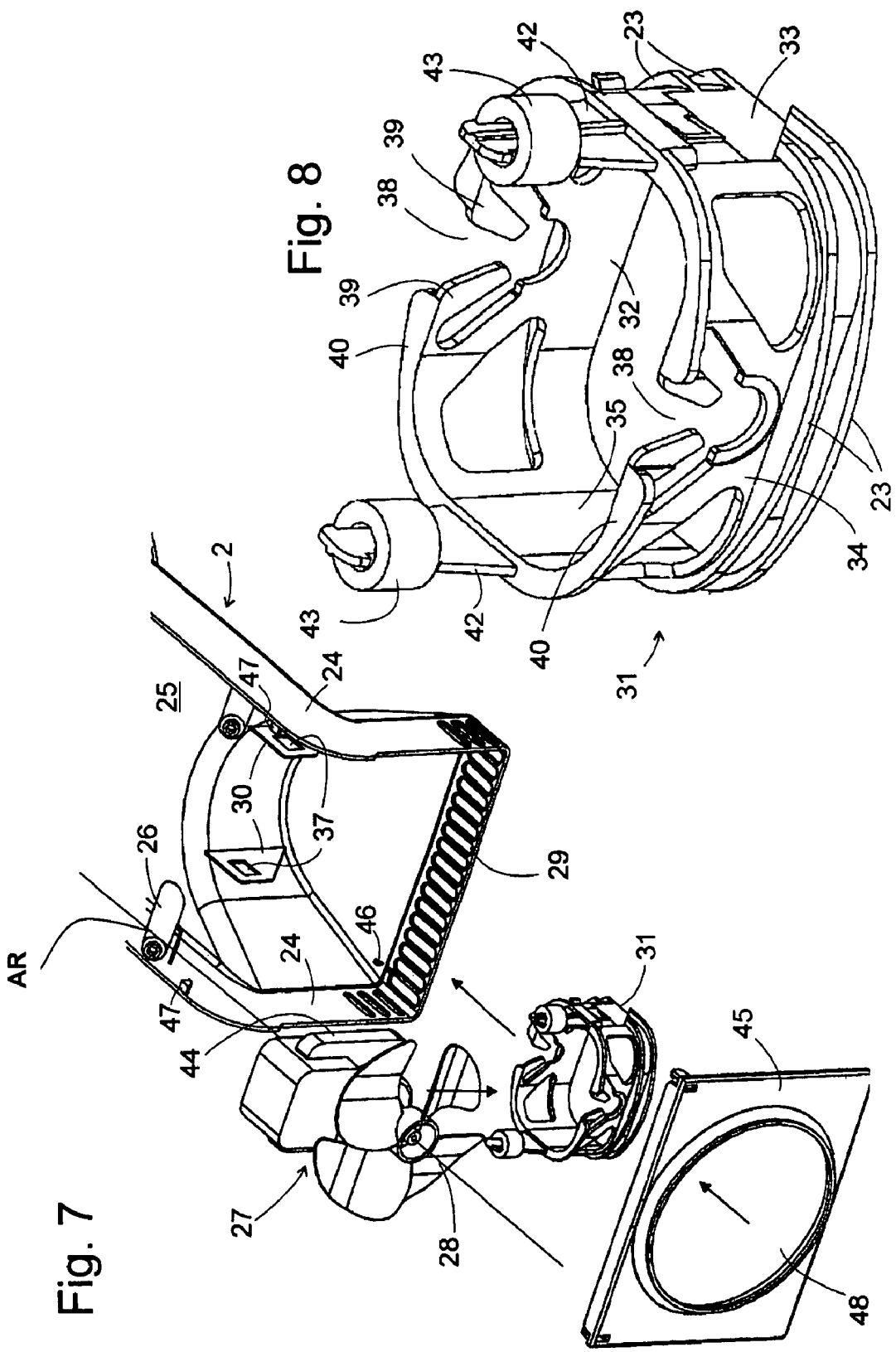

MOUNTING A MOTOR ON A CARRIER

The present invention relates to a motor arrangement for the assembly of a motor, in particular an electromotor, on a carrier, as well as an electrical appliance, in which such a motor arrangement is used.

To mount a motor economically and securely on a carrier, e.g. in an appliance housing, in general special adaptation of the carrier to the configuration of the motor housing is required, enabling locking, screwing or some other type of fastening of the motor on the carrier with few handles or using an automatic assembly tool. At the same time the problem often arises for an appliance manufacturer, who incorporates such motors into his appliances, where, in the interests of preventing dependency on a single supplier, it ought to be possible to indifferently utilise motors manufactured by different suppliers, whether in that motors from different manufacturers can be incorporated in each case in different appliance models, or in that motors of varying origin are used within series production for the same appliance model. These motors frequently differ slightly in shape and dimensions, so that one carrier which is adapted especially to a specific make of motor can be unuseful for a second. This obliges the appliance manufacturer to use different carriers depending on make of motor.

This means, if the carrier is the housing of the appliance to be manufactured itself, as many different housing types can be necessary as there are makes of motor to be used. The high costs associated with manufacturing different moulding tools for manufacturing the housings and with providing different types of housing make such a method uneconomical.

Similar problems arise in continuous production of an appliance when the motor model being used is to be replaced by a newly developed, more advantageous model with slightly modified housing configuration.

These problems can be further eased, if a uniform carrier and different models of mounting clamps are used instead of different models of carriers, which are in each case made specifically to secure a certain make of motor, and all of which have uniform fastening means for fastening to the uniform carrier.

The economic advantage results only from such a mounting clamp generally being produced as a smaller and more cost-efficiently item than the carrier, to which it connects the motor, and therefore from the costs associated with producing different types of mounting clamps being less, than if different carriers have to be produced. The problem where different types of mounting clamps have to be kept ready, and in each case selected to match the motor to be installed, is not, however, solved by this measure.

The object of the present invention is to provide a motor arrangement for assembly of a motor on a carrier, which allows the assembly of different makes of motor with different dimensions and forms of housing, easily and with uniform parts.

This task is solved by a motor arrangement having the characteristics of claim 1.

In that, according to the present invention, the flanks of the mounting clamps support the motor in each case on its shaft lugs, the shaft of the motor itself is fixed effectively spatially, without the shape of the motor housing having to be established exactly by the shaft lugs. To avoid torque of the motor from rotating its housing, contact between the mounting clamps and the motor housing is still necessary at an appropriate place remote from the shaft.

Arms of the mounting clamps, which make such rotation-blocking contact with the motor housing, are elastic so that deviations in housing dimensions from one make of motor to the other can be adapted.

These two arms preferably touch the motor at two points, whereof the imaginary joining line runs transversely to the axis of rotation of the motor and at a distance from the latter. Since the arms are elastic, they do not fully block rotation of the motor, rather they yield to torque of the motor a little further. The extent to which the arms yield is all the smaller with the given spring constant of the arms, the greater the distance of the contact points or respectively their joining line from the axis of rotation.

Considerable stability of the mounting clamps is achieved when the flanks receiving the shaft lug of the motor with flanks oriented parallel to its axis of rotation are attached to a frame encircling the motor. The arms blocking the rotary movement preferably project from the axis-parallel flanks of the frame.

It is also advantageous if the arms have a tip, on which a ring made of a flexible material is set. Then it is a surface of the ring touching the housing of the motor. So as to be able to fix the motor securely in the case of greater deviations in the dimensions of the motor housing, the ring is preferably exchangeable, so that rings of varying thickness can be selected, depending on motor dimensions.

To enable rapid assembly of the motor in the mounting clamp, at least one of the recesses receiving a shaft lug is open to an edge of the flank, in which it is formed, on the mounting clamp. The second recess can be closed, in which case, to assemble the motor, the latter must be inserted into the closed recess with a shaft oriented transversely to a direction defined by the two recesses and then swivelled to insert the second shaft lug, into the recess open at the edges. Both recesses are preferably open at the edges, so that the motor can be placed in the mounting clamp through simple translation.

An inlet area of the recess near the edge is effectively limited by two flexible arms, which yield when the shaft lug is inserted into the recess from the side and, as soon as the shaft lug has passed, can return to their relieved position, in which they prevent the shaft lug from leaving the recess again. These flexible arms are effectively connected at the level of the edge of the flank to the latter and from there extend into the interior of the recess.

In order to guarantee easy forming of the basic component by injection moulding, ends of the slats facing the hood are preferably left unjoined.

As described hereinabove, a mounting clamp can be used in a large number of electrical appliances; a preferred application is the assembly of a motor for a fan in a refrigerating appliance.

Further features and advantages of the invention will emerge from the following description of an embodiment with respect to the attached figures, in which:

FIG. 2 shows a partial section through the refrigerating appliance and the inbuilt structural unit in a first, long stretched out configuration;

FIG. 3 shows a further partial section with the same structural unit, this time in a second, shortened configuration;

FIG. 4 is a view of the structural unit in the long stretched out configuration from below;

FIG. 5 is a perspective view of the hood of the structural unit;

FIG. 7 is an exploded illustration of the second housing part and the fan components it houses; and FIG. 8 is an enlarged view of an assembling clamp of FIG. 7.

Figure 1:
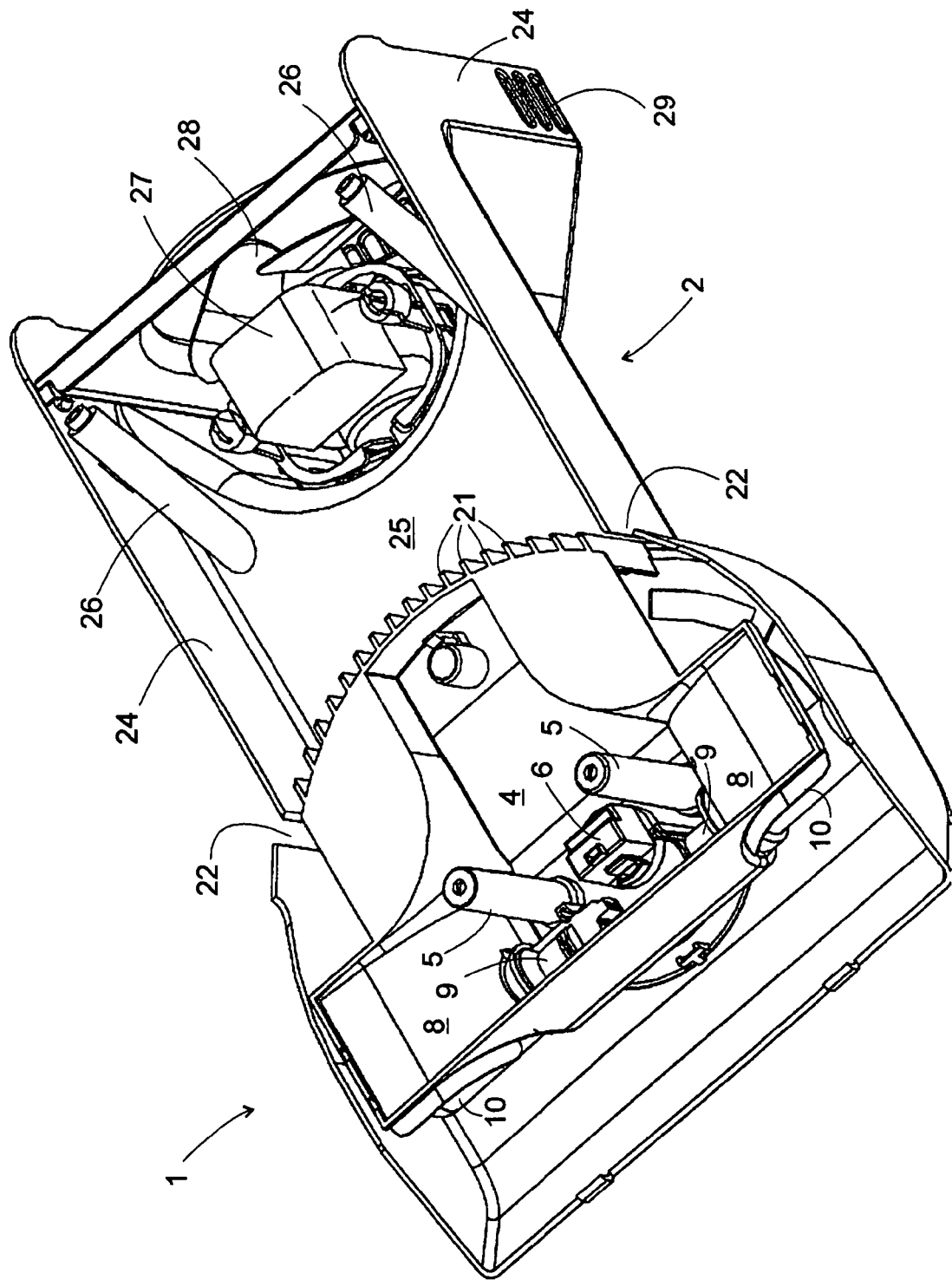
FIG. 1 is a perspective plan view of a combined lighting and fan structural unit for incorporating in a refrigerating appliance.

FIG. 1 is a perspective view of a combined lighting and fan structural unit, which is provided for mounting under the ceiling of the interior of a refrigerating appliance. The structural unit comprises a first housing part 1, and a second housing part 2, which are not joined to one another, but each is attached separately to the ceiling of the interior of the refrigerating appliance. Part of the first housing part 1 is a basic component 3, which is provided for direct attaching to the ceiling. In the figure the view is from behind into an approximately T-shaped hollow raised section 4 of the basic component 3. In a core zone of the raised section 4 two screw shafts 5 are formed, which are provided to take up a screw (not illustrated) from behind, with which the basic component 3 is firmly screwed onto the ceiling. Situated between the two screw shafts 5 is a bayonet coupling element 6, the purpose of which, in a manner yet to be explained in greater detail, is to fasten a hood 7 which covers the basic component 3.

A screw mounting 9, which holds an incandescent lamp 10 or another suitable illuminant, extends through two oblique flanks 8 of the raised section 4 in each case. The outside of the flank 8 averted from the observer can be provided with a metallic reflector in the form of a thin sheet or an adhered film, to improve the light radiation and to protect the flank 8 from overheating by the incandescent lamp 10.

FIG. 5 is a perspective view of the hood 7 seen obliquely from the front and from below, in the perspective in which it is also visible when built into a refrigerating appliance. The hood has an approximately prism-shaped front section 11, in which the incandescent lamps 10 are housed, and a flat semi-cylindrical rear section 12. Formed on the underside of the rear section 12 is a row of ventilating slots 13. Protruding trunnions 14 on the upper edge of the hood prevent the hood 7 from lying closely on the ceiling of the interior of the refrigerating appliance. On the one hand additional ventilating slots are formed between the edge of the hood and the ceiling, and on the other hand the distance between hood and ceiling ensures that minimal differences in form between both, attributable to tolerances in manufacturing of the refrigerator interior container, are not visible to an observer.

A rotatable cap 15 is added to a central opening of the hood 7. On its outside the cap 15 has a flat round handling knob 16 with a roughened edge, which makes it easy for a user to rotate the cap 15.

FIG. 6 shows, again in a perspective obliquely from above, a front area of the basic component 3 and the hood 7 in the separated state. Evident on the inside of the rotatable cap 15 are protruding detent hooks 17, engaging behind the edge of the hood 7, which keep the cap 15 rotational in the opening of the hood 7. In the middle of the cap 15 a bayonet coupling element 18 protrudes. When the cap 15 is first rotated the bayonet coupling element 18 can be inserted into the complementary bayonet coupling element 6 of the basic component 3, and when the cap 15 is rotated into a second position it can be locked onto the basic component 3.

Figure 6:
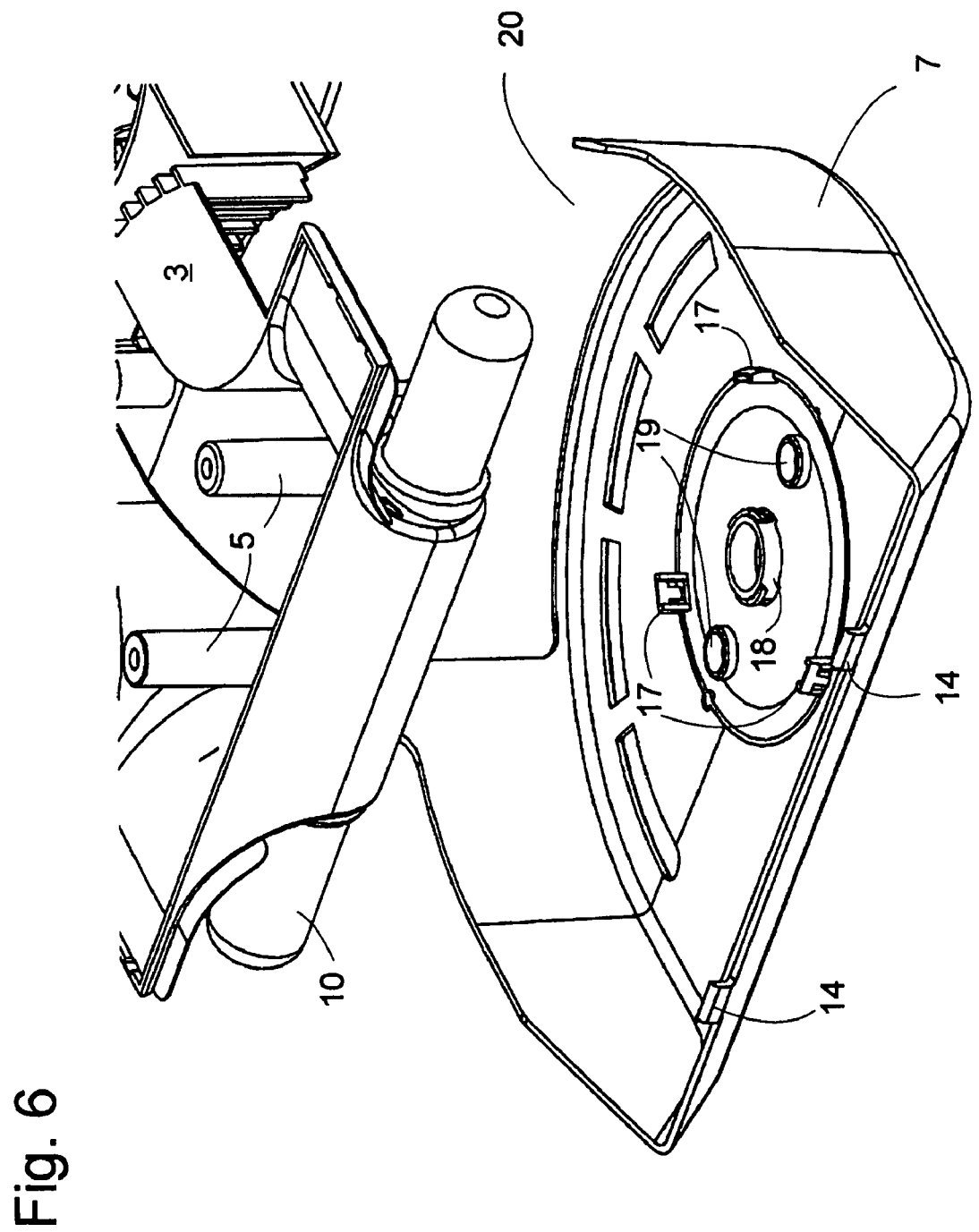
FIG. 6 is an exploded illustration of the first housing part, which shows the hood and a part of the basic component.

In each case FIGS. 5 and 6 show the cap 15 in its locked orientation. In this orientation two openings 19 of the cap 15 align with the screw shafts 5 of the basic component. This makes it possible to fully premount the first housing part 1 prior to its being built into the refrigerating appliance, and to mount the basic component on the ceiling of the interior of a refrigerating appliance by means of screws introduced through the openings 19 in the shafts 5, without having to detach the hood 7 again.

A large-surface section 20 is formed in a rearwards area of the hood 7. When the hood is in the assembled state, slats 21, which are formed protruding vertically downwards on the basic component 3, engage in this section 20. The slats 21 are connected only by their upper end to the basic component 3; their lower ends are unconnected, so that the basic component 3 can be injection-moulded together with the slats 21 using simple mould tools.

The slats 21 fill out the section 20, but not to its full width and height. When basic component 3 and hood 7 are joined together this results on the rear side of the first housing part 1 in a gap with an approximately C-shaped cross-section along the edges of the section, in which the second housing part 2 correspondingly formed to this cross-section can be guided and can be shifted within certain limits in its longitudinal direction.

FIG. 1 shows the second housing part 2 with a front edge placed directly in front of the C-shaped gap 22 limited by the section 20 and the slats 21. The second housing part 2 has L-shaped side walls 24, whereof the outer edges are in each case formed to adapt positively in their upper horizontal area on the ceiling and in their rear vertical area on the rear wall of the interior of the refrigerator. Going away from a horizontal ceiling 25 connecting the side walls 24 are obliquely oriented screw shafts 26, which serve to fasten the housing part 2 on the ceiling of the inner container. In a front area the housing part 2 forms a hollow channel of flat rectangular cross-section, which can be inserted to a variable depth into the gap 22 of the first housing part. In a rear area the housing part 2 is expanded downwards to accommodate a fan with an electromotor 27 and an impeller 28 driven by the electromotor 27. When the fan is operating it generates an air current, which sucks air out of the first housing part 1 and expels it through slots 29 of the second housing part 2 adjacent to the rear wall of the interior to thus generate an air flow along the rear wall of the interior cooled by an evaporator.

As seen in FIG. 7, the electromotor 27 has an axis of rotation AR.

The inner structure of the second housing part is explained in greater detail by means of FIGS. 7 and 8. FIG. 7 shows, viewed obliquely from above and behind, an exploded partial view of the second housing part 2 and inbuilt components. Two parallel holding axes 30 are formed on an inner wall of the housing part 2. They are provided to hold an assembling clamp 31 shown enlarged in FIG. 8. The assembling clamp 31 formed in one part from a synthetic material has four opposite flanks 32 to 35 arranged in pairs interconnected via rounded corners. Formed on even outer sides of the flanks 33,35 in each case is a detent wedge 36, which, whenever the assembling clamp 31 is guided in between the holding axes 30, engages in one of its windows 37 and thus locks in the assembling clamps 31 on the housing part 2.

A recess 38 open to the top is formed in opposite long flanks 32,34 in each case. An inlet area of the recess 38 is limited by two arms 39 running towards one another from top to bottom, which are connected to the rest of the flank 32,34 only by narrow legs in the level of their upper edge 40, and as a result can be flexibly deflected. In a lower area of the recess 38 a semicircular-shaped rounding 41 is formed. Its diameter is such that it positively receives a shaft lug of the electromotor 27, which is pressed in from above into the assembling clamp 31. The arms 39 deflected out when the motor is pressed into the assembling clamp 31 return to their relieved position shown in FIG. 8, as soon as the shaft lug has passed them, and thus hinder the motor 27 from escaping upwards from the assembling clamp 31. In this way the shaft of the motor 27 is securely fixed independently of its exact housing dimensions. Only the diameter of the shaft lug of the motor 27 must be adapted within certain tolerances to the dimensions of the recess 38.

To prevent the arms 39 deflecting in the direction of the axis of the motor 27, through which the motor could be freed from the assembling clamp 31, the upper edge 40 of the flanks 32, 34 is reinforced by ribs protruding in the direction of the axis of the motor. Corresponding ribs 23 are also formed under the recess 38 on the flanks 32, 34.

And to prevent the motor 27 from rotating about its own axis, the assembling clamp 31 is fitted with two flexible arms 42, which project upwards from the flanks 33, 35 parallel to the axis of the motor 27. A rubber ring 43 is latched behind a widened tip of the arms 42 in each case. In the relieved state the rubber rings 43 are circular. The widening at the tips of the arms 42 is such that the rubber rings 43 are held back by them in their relieved position, but that, when they are pressed flat on the arms 42, come free from the projections and can be drawn up without resistance and replaced by rings with another wall thickness.

When the electromotor 27 is placed in the assembling clamp 31, the surfaces of the rubber rings 43 facing each other touch the lateral flanks of a stator packet 44 of the motor. Due to the elasticity of the arms and the rubber rings 43 it is easily possible to anchor motors in the assembling clamp 31, which differ in the width of their stator packet by several millimeters. Even greater tolerances in dimensions can be absorbed by corresponding exchange of the rubber rings 43.

The expenditure of labour for assembling the electromotor 27 in the housing part 2 is minimal: it suffices to lock the motor in the recesses 38 of the assembling clamp 31 and to lack the assembling clamps 31 in the holding axes 30 of the housing part 2.

When the fan is mounted another panel 45 is hung on snap-lock lugs 46,47 of the housing part 2. The panel 45 has a circular central window 48, whereof the diameter corresponds to that of the impeller 28. It prevents air blown by the fan against the rear wall of the refrigerating appliance inside the housing part 2 from flowing past the impeller 28 forwards again, thus improving the efficiency of the fan.

FIGS. 2 and 3 show two cuts through the two housing parts 1,2 and their inbuilt components, mounted under the ceiling 49 of the inner container of a refrigerator appliance. FIG. 2 shows an exploded configuration, in which the front area of the second housing part 2 penetrates only slightly into the first housing part 1. In the area near the door the ceiling 49 has an inclined section 50 with a step 51. The position of the first housing part 1 is fixed by contact by the trunnions 14 of the hood 7 with the step 51. The upper edge 52 of the hood facing the inclined section 50 7 is parallel to the inclined section 50, and between both is located a ventilation gap 53.

FIG. 3 shows the two housing parts in an assembled configuration, in which the second housing part 2 engages far into the first housing part 1. The trunnions 14 are pushed back by the step 51 of the ceiling 49, resulting in a very large air inlet gap. Since the two housing parts 1,2 can be moved gradually and telescopically towards one another, the cross-section of the ventilation gap can be adapted flexibly as required.

The particular usage of telescopic displaceability of the housing parts 1,2 however is that they can be used in different assembled configurations for incorporating in refrigerating appliances with different depths of the interior without adaptation.

The invention claimed is:

1. An arrangement for assembly of a motor on a carrier, the arrangement comprising:

a mounting clamp for securement of a respective motor thereto, said mounting clamp and a respective motor secured thereto being fastenable as a unit onto a carrier, said mounting clamp being operable to secure a respective motor having a shaft rotatable about an axis of rotation and a motor housing, the motor housing having one side portion located on one side of an axial plane in which the axis of rotation lies and another side portion located on an opposite side of the axial plane, the one side portion of the motor housing being at a different radial spacing from the axis of rotation than the other side portion of the motor housing, and the motor housing including one shaft lug toward one axial end of the motor housing and another shaft lug toward an opposite axial end of the motor housing that is axially spaced from the one axial end of the motor housing, said mounting clamp having a receiving cavity in which a respective motor is received and said mounting clamp having one flank on an axial side of said mounting clamp and another flank on an opposite axial said of said mounting clamp, said one flank having a recess for receiving one shaft lug of a motor housing of a respective motor and said another flank having a recess for receiving another shaft lug of the motor housing of the respective motor, and the respective motor being received in said receiving cavity of said mounting clamp with the one shaft lug of the motor housing being received in and extending axially along said one flank of said mounting clamp and the other shaft lug of the motor housing being received in and extending axially along said another flank of said mounting clamp, and said mounting clamp having a contact portion with a first engagement location for contacting, at a radial spacing from the axis of rotation, the one side portion of the motor housing of the respective motor on the one side of the axial plane and a second engagement location for contacting, at a radial spacing from the axis of rotation, the other side portion of the motor housing of the respective motor on the opposite side of the axial plane, the combined radial spacings of said first and second engagement locations of said contact portion defining a radial cavity width of said mounting clamp and said radial cavity width of said mounting clamp being automatically adjustable from a first radial cavity width to a second radial cavity width in response to a receipt of a second respective motor in said receiving cavity of said mounting clamp having a different radial extent than a first respective motor, and said first and second engagement locations of said contact portion resisting angular pivoting of a respective motor about its axis of rotation while the respective motor is received in said mounting clamp; and means for fastening said mounting clamp to a carrier.

2. The motor arrangement according to claim 1, wherein said mounting clamp includes a first arm on which said first engagement location is located and a second arm on which said second engagement location is located, and said first and second arms are each securable to a carrier to thereby secure said mounting clamp to the carrier.

3. The motor arrangement according to claim 2, including said first and second arms each have a tip on which a ring made of a flexible material is mounted.

4. The motor arrangement according to claim 3, including said ring is exchangeable with other rings.

5. The motor arrangement according to claim 1, including at least one of said recesses is open to an edge of one of said one flank and said other flank of said mounting clamp in which said recess is formed.

6. The motor arrangement according to claim 5, including an inlet area of said recess near an edge thereof is delimited by two flexible arms.

7. The motor arrangement according to claim 6, including said flexible arms are connected substantially at the level of said edge to said flank and extend inside said recess.

8. The motor arrangement according to claim 7, including said flanks having reinforcing ribs.

9. A household appliance comprising:
a compartment for receiving therein items to be handled;
a motor, the motor having a shaft rotatable about an axis of rotation and a motor housing, the motor housing having one side portion located on one side of an axial plane in which the axis of rotation lies and another side portion located on an opposite side of the axial plane, the one side portion of the motor housing being at a different radial spacing from the axis of rotation than the other side portion of the motor housing, and the motor housing including one shaft lug toward one axial end of the motor housing and another shaft lug toward an opposite axial end of the motor housing that is axially spaced from the one axial end of the motor housing; and
an arrangement for assembly of the motor to the household appliance, the arrangement including:
a.) a mounting clamp for securement of the motor thereto, said mounting clamp and the motor secured thereto being fastenable as a unit onto a carrier, said mounting clamp having a receiving cavity in which a motor is received and said mounting clamp having one flank on an axial side of said mounting clamp and another flank on an opposite axial said of said mounting clamp, said one flank having a recess for receiving one shaft lug of a motor housing of a motor and said another flank having a recess for receiving another shaft lug of the motor housing of the motor, and the motor being received in said receiving cavity of said mounting clamp with the one shaft lug of the motor housing being received in and extending axially along said one flank of said mounting clamp and the other shaft lug of the motor housing being received in and extending axially along said another flank of said mounting clamp, and said mounting clamp having a contact portion with a first engagement location for contacting, at a radial spacing from the axis of rotation, the one side portion of the motor housing of the motor on the one side of the axial plane and a second engagement location for contacting, at a radial spacing from the axis of rotation, the other side portion of the motor housing of the motor on the opposite side of the axial plane, the combined radial spacings of said first and second engagement locations of said contact portion defining a radial cavity width of said mounting clamp and said radial cavity width of said mounting clamp being automatically adjustable from a first radial cavity width to a second radial cavity width in response to a receipt of a second respective motor in said receiving cavity of said mounting clamp having a different radial extent than the motor, and said first and second engagement locations of said contact portion resisting angular pivoting of the motor about its axis of rotation while the motor is received in said mounting clamp; and
b.) means for fastening said mounting clamp to the household appliance.

10. The household appliance according to claim 9, wherein said mounting clamp includes a first arm on which said first engagement location is located and a second arm on which said second engagement location is located, and said first and second arms are each securable to the household appliance to thereby secure said mounting clamp to the household appliance.

11. The household appliance according to claim 10, including said first and second arms each have a tip on which a ring made of a flexible material is mounted.

12. The household appliance according to claim 11, including said ring is exchangeable with other rings.

13. The household appliance according to claim 10, including a pair of holding axes, each of said first and second arms being attached to a respective one of the holding axes, and said pair of holding axes are disposed at a fixed radial spacing from one another.

14. The household appliance according to claim 9, including at least one of said recesses is open to an edge of one of said one flank and said other flank of said mounting clamp in which said recess is formed.

15. The household appliance according to claim 14, including an inlet area of said recess near an edge thereof is delimited by two flexible arms.

16. The household appliance according to claim 15, including said flexible arms are connected substantially at the level of said edge to said flank and extend inside said recess.

17. The household appliance according to claim 16, including said flanks having reinforcing ribs.

18. The household appliance according to claim 9, including the compartment includes an interior enclosed by a heat-insulating housing, the motor is a fan motor, and said mounting clamp with the fan motor secured thereto is mounted in the interior of the compartment.

* * * * *